May 4, 1948.　　　　　P. P. JONES　　　　　2,440,955
LIGHT PROJECTOR
Filed Feb. 5, 1947
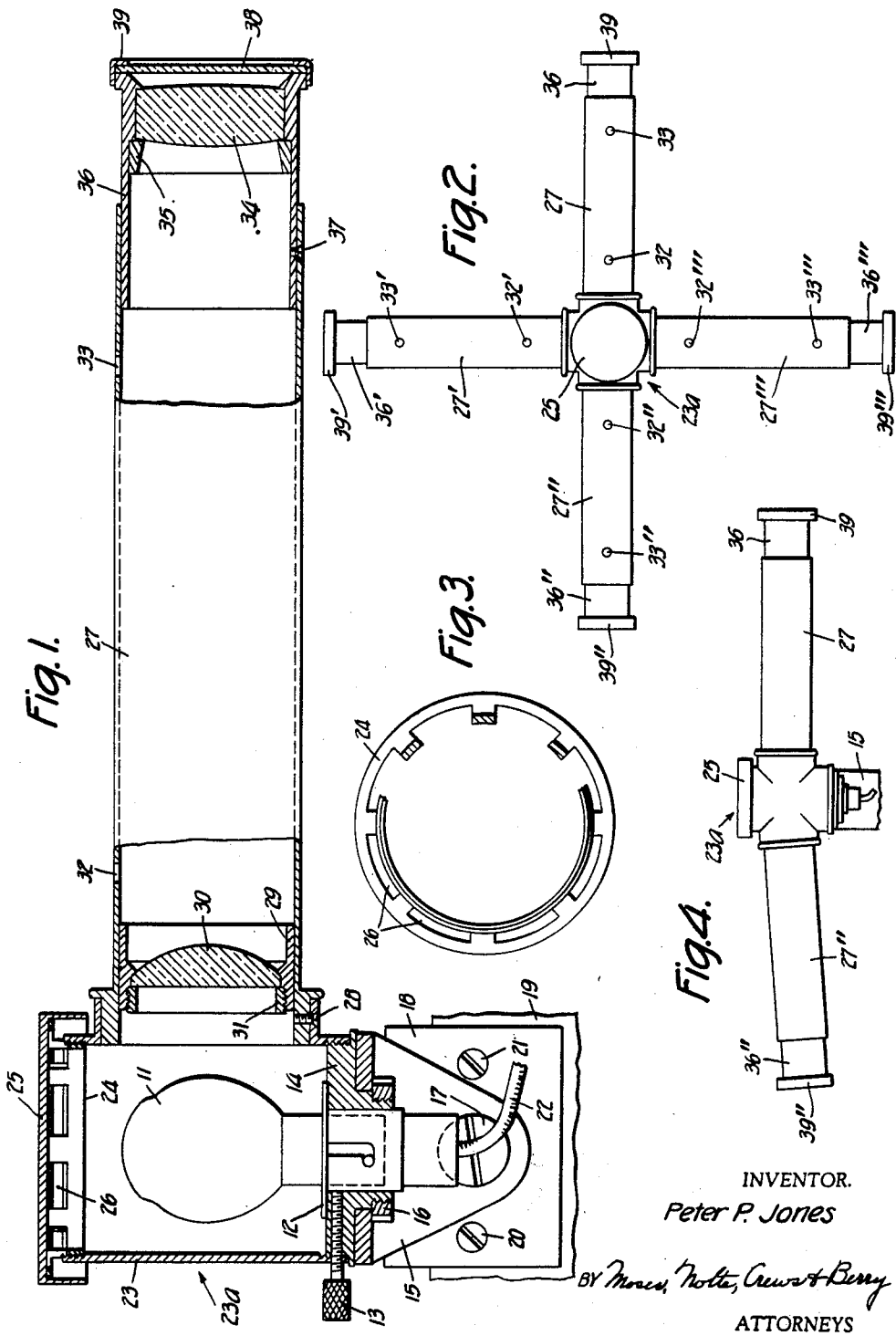
INVENTOR.
Peter P. Jones
BY Moses, Nolte, Crews & Berry
ATTORNEYS Patented May 4, 1948

2,440,955

UNITED STATES PATENT OFFICE 2,440,955

LIGHT PROJECTOR

Peter P. Jones, New York, N. Y.

Application February 5, 1947, Serial No. 726,659

2 Claims. (Cl. 240—41.3)

My invention relates to lights suitable for penetrating fog, smoke and similar atmospheric conditions which impair the range of visibility.

An object of my invention is to provide a lamp of simple and compact design and inexpensive of manufacture which may be secured either to a fixed object or to a ship, vehicle or other moving object and which under severe conditions of fog, will give an indication to approaching vehicles or the like at a sufficient distance to greatly reduce the hazard of collision.

A further object of my invention is to provide a lamp of this type, which when used on a moving vehicle will provide a strong and concentrated reflection in the direction of the operator of the vehicle of sufficient clarity and distinctness to permit it to be seen by the operator from a sufficient distance to prevent danger of collision. This effect is obtained by the concentrated nature of the light beam, together with the use of characteristic colors which prevent confusion with random reflections from other sources and which offer a maximum degree of fog penetrating ability.

From another aspect the invention provides a plurality of distinctive beams, each oriented in a different direction, thus affording protection against collision from a moving vehicle approaching from any such direction.

Another object of the invention is to provide a beam, suitable for projection from the rear of a vehicle and of high penetrating power and narrow angular dispersion, so arranged that a red area or area of other suitable distinctive coloration will be produced on the surface of a roadway at a distance behind the vehicle sufficient to provide warning to other vehicles approaching or overtaking the first vehicle.

A further object of the invention is to provide a projector for a beam of light with adjustable focusing facilities, arranged to concentrate the light into a minimum cross sectional area as it is projected, thus reducing the dispersive effects of fog or similar atmospheric conditions.

Other and further objects will become apparent upon reading the following specification together with the accompanying drawings forming a part hereof.

Referring to the drawings,

Fig. 1 shows a view in sectional elevation of an embodiment of the invention;

Fig. 2 shows a plan view of the embodiment of Fig. 1, modified to provide projection in a plurality of directions;

Fig. 3 is a bottom view of the ventilating cap portion of Fig. 1, partly broken away; and Fig. 4 is a side view of a modification of the embodiment of Fig. 1, providing projection in two directions with one of the projector tubes slightly downwardly inclined.

Referring to Fig. 1, an incandescent lamp 11, which is shown as being of the bayonet type, is mounted in a suitable socket 12 which is secured by set screw 13 in a threaded holder 14. Socket 12 may be removed from holder 14 by loosening set screw 13, and its position may be adjusted vertically and locked by tightening screw 13.

Holder 14 is secured by a slotted nut 16 to a horizontal portion of an adjustable bracket 15, and this bracket is in turn secured by screw 17 to a mounting plate 18 adapted to be fastened as desired to a suitable mounting surface 19 by mounting screws 20 and 21.

Energy for lamp 11 is supplied to socket 12 by means of suitable conductors preferably in the form of a flexible cord 22. In some instances, it may be preferable to use a single conductor cord, the other side of the electrical system being grounded to the mounting surface 19, which in this case must necessarily be electrically conductive, as must likewise be other portions of the device including mounting plate 18, bracket 15 and holder 14 in order to bring the other side of the electrical source to the outer shell of socket 12.

A body member 23 forms part of a lamp house 23a and is threadedly secured to holder 14 and is provided with a vented ring member 24 which is covered by a cap 25 secured thereto. Ring member 24 is provided with a plurality of vents 26 and is threadedly secured to body member 23.

A tube 27 is fitted into a lateral opening in body member 23 and secured therein by screw 28. Adjustably mounted in tube 27 is a lens holder 29 in which a plano-convex lens 30 is held by threaded retaining ring 31. Tube 27 is provided with vent holes 32 and 33 which are adapted to permit the circulation of air within the tube and thus prevent the accumulation of moisture therein or the forming of condensation on the lenses.

At the outer end of tube 27, a double convex lens 34 of relatively long focal length is held by retaining ring 35 in an elongated holder 36 which is slidable within tube 27 and which is held in correct position of adjustment by screw 37.

A color filter 38 is mounted at the end of holder 36, being secured thereto by external retaining ring 39.

In Fig. 2, body member 23 has been modified to provide openings for the mounting of four tubes 27, 27' and 27" and 27"'. As illustrated, they are at right angles to each other and provide four beams directed accordingly. They may be disposed at any other angles, as may be desired, depending upon the requirements of the particular installation. Similarly, a greater or lesser number of tubes may be provided, as desired.

In Fig. 4, the embodiment of Fig. 1 has been modified to provide two tubes, 27 and 27". These are directed in opposite directions and one of the tubes is slightly downwardly inclined. This modification is adapted for use with vehicles, the tube 27 being suitable for projection of a beam in a forward direction and the other tube 27" being adapted to project a rearward beam at a downward angle so that it will form a bright spot on the roadway at some distance behind the vehicle. Preferably the rearward tube 27" is provided with a red color filter to form a bright red spot on the roadway behind the vehicle. The rear tube 27" should be so inclined that the spot will be at a sufficient distance behind the vehicle to afford ample warning to rearwardly approaching or to overtaking vehicles of the presence of the vehicle equipped with the projector. Because of the high fog penetrating power of the concentrated beam, the spot will be visible on the roadway, even though the vehicle itself may not be visible.

In operation, the optical system comprising lenses 34 and 30 is so proportioned that a substantially parallel beam of light emerges from the outward end of holder 36. Because of the long focal length of the optical system, there is very little lateral dispersion of the beam and its ability to penetrate fog is increased accordingly.

Because of the concentrated nature of the beam, it produces relatively little illumination of the fog outside its immediate path. Upon striking a reflective surface, the reflected light is visible to a greater degree than would otherwise be the case because of the lack of dispersed light in the area immediately surrounding the beam.

I have described what I believe to be the best embodiments of my invention. I do not wish, however, to be confined to the embodiments shown, but what I desire to cover by Letters Patent is set forth in the appended claims.

I claim:

1. In a device of the class described, a central body member, a source of light adjustably mounted in the member, a pair of horizontally mounted tubes extending in opposite directions from the body member, one of the tubes being slightly downwardly inclined, each tube being disposed to pass light from the source lengthwise thereof, an optical system of relatively long focal length adjustably mounted in each tube and arranged to produce a concentrated beam of substantially parallel rays, and a distinctive color filter disposed at the end of the downwardly inclined tube.

2. In a device of the class described, a central body member, a source of light adjustably mounted in the member, means for retaining the adjustment, a pair of horizontally mounted tubes extending in opposite directions from the body member, one of the tubes being slightly downwardly inclined, each tube being disposed to pass light from the source lengthwise thereof, an optical system of relatively long focal length adjustably mounted in each tube and arranged to produce a concentrated beam of substantially parallel rays, and a distinctive color filter disposed at the end of the downwardly inclined tube.

PETER P. JONES.

REFERENCES CITED

The following references are of record in the file of this patent:

UNITED STATES PATENTS

| Number | Name | Date |
|---|---|---|
| 1,159,274 | Roland | Nov. 2, 1915 |
| 1,695,556 | McGunnigle | Dec. 18, 1928 |
| 1,964,591 | Nanfeldt | June 26, 1934 |
| 2,328,445 | Francis | Aug. 31, 1943 |